(12) United States Patent
Fossen et al.

(10) Patent No.: US 7,496,434 B2
(45) Date of Patent: Feb. 24, 2009

(54) SYSTEM AND METHOD FOR TESTING A CONTROL SYSTEM OF A MARINE VESSEL

(75) Inventors: Thor Inge Fossen, Trondheim (NO); Asgeir Johan Sørensen, Flatåsen (NO); Olav Egeland, Trondheim (NO); Tor Arne Johansen, Vikhamar (NO); Jon Rysst, Bekkestua (NO); Tor E. Svensen, Slemmestad (NO)

(73) Assignee: Marine Cybernetics AS, Tiller (NO)

( * ) Notice: Subject to any disclaimer, the term of this patent is extended or adjusted under 35 U.S.C. 154(b) by 82 days.

(21) Appl. No.: 11/650,977

(22) Filed: Jan. 9, 2007

(65) Prior Publication Data

US 2007/0250227 A1 Oct. 25, 2007

Related U.S. Application Data

(63) Continuation of application No. 10/541,036, filed as application No. PCT/NO03/00445 on Dec. 30, 2003, now Pat. No. 7,177,734.

(30) Foreign Application Priority Data

Dec. 30, 2002 (NO) .................................. 20026284

(51) Int. Cl.
*G05D 1/00* (2006.01)
*B63B 39/06* (2006.01)

(52) U.S. Cl. .............................. 701/21; 701/29; 701/36; 701/33

(58) Field of Classification Search ...................... 701/2, 701/21, 29, 26, 33; 340/850, 438–439; 702/182–185
See application file for complete search history.

(56) References Cited

U.S. PATENT DOCUMENTS 3,877,312 A * 4/1975 Audet et al. ............... 73/865.6

| 4,301,760 A | 11/1981 | Cassone et al. |
| 5,023,791 A | 6/1991 | Herzberg et al. |
| 5,214,582 A * | 5/1993 | Gray ........................... 701/33 |
| 5,260,874 A | 11/1993 | Berner et al. |

(Continued)

FOREIGN PATENT DOCUMENTS

EP 1168121 A2 * 1/2002

(Continued)

OTHER PUBLICATIONS

FerryBox and MERIS—Monitoring of Coastal and Shelf Sea Ecosystems by In-situ and Remote Sensing; Petersen, W.; Krasemann, H.; Oceans 2007—Europe; Jun. 18-21, 2007 pp. 1-6; Digital Object Identifier 10.1109/OCEANSE.2007.4302239.*

(Continued)

*Primary Examiner*—Cuong H Nguyen
(74) *Attorney, Agent, or Firm*—Rothwell, Figg, Ernst & Manbeck, PC (57) ABSTRACT

A system for testing a vessel control system includes sensors on board the vessel to send one or more sensor signals over a signal line to the control system; command input devices on board the vessel to send one or more of desired position, course, velocity, etc. over a command signal line to the control system; an algorithm in the control system to compute control signals to based on sensor data, communication lines for sending of one or more simulated signals and/or simulated command signals from a remote test laboratory to the control system; and a simulator including an algorithm for the simulation of the new dynamic state of a vessel model based on a previous state, the control signals, and the dynamic parameters of the vessel. The control system continues to compute the control signals to achieve at least one of desired position, course, velocity, etc. based on real and/or simulated sensor signals and real and/or simulated command signals.

20 Claims, 7 Drawing Sheets

U.S. PATENT DOCUMENTS

| | | | |
|---|---|---|---|
| 5,523,951 | A | 6/1996 | Kriesgman et al. |
| 5,541,863 | A | 7/1996 | Magor et al. |
| 6,298,318 | B1* | 10/2001 | Lin .............................. 703/23 |
| 6,450,112 | B1* | 9/2002 | Deghuee ................. 114/144 R |
| 6,505,574 | B1 | 1/2003 | Naud et al. |
| 6,526,356 | B1 | 2/2003 | DiMaggio et al. |
| 6,847,872 | B2* | 1/2005 | Bodin et al. ................... 701/33 |
| 7,177,734 | B2* | 2/2007 | Fossen et al. ................. 701/21 |
| 2003/0139916 | A1* | 7/2003 | Choe et al. .................... 703/10 |
| 2006/0058929 | A1* | 3/2006 | Fossen et al. ................. 701/21 |
| 2006/0116796 | A1* | 6/2006 | Fossen et al. ................. 701/21 |
| 2007/0250227 | A1* | 10/2007 | Fossen et al. ................. 701/21 |

FOREIGN PATENT DOCUMENTS

| | | |
|---|---|---|
| NO | 20010397 | 5/2002 |
| SU | 508713 | 5/1976 |
| WO | WO 9214216 A1 | 8/1992 |
| WO | WO 0073815 A1 | 12/2000 |
| WO | WO 02058989 A1 | 8/2002 |
| WO | WO 03093913 A1 | 11/2003 |

OTHER PUBLICATIONS

Design criteria for automated data acquisition systems in the marine environment; Erichsen, R.; Oceans vol. 17, Nov. 1985 pp. 225-229.*

The WindSat space borne polarimetric microwave radiometer: sensor description and mission overview;Gaiser, P.W.; Twarog, E.M.; Li Li; St Germain, K.M.; Poe, G.A.; Purdy, W.; Jelenak, Z.; Chang, P.S.; Connor, L.; Geoscience and Remote Sensing Symposium, 2004. IGARSS '04. Proceedings. 2004 IEEE International;vol. 1, Sep. 20-24, 2004.*

Distributed Simulation Applied to Shipboard Power Systems; Qinghua Huang; Jian Wu; Bastos, J.L.; Schulz, N.N.; Electric Ship Technologies Symposium, 2007. ESTS '07. IEEE; May 21-23, 2007 pp. 498-503; Digital Object Identifier 10.1109/ESTS.2007.372132.*

Operational experience with intelligent software agents for shipboard diesel and gas turbine engine health monitoring; Logan, K.P.; Electric Ship Technologies Symposium, 2005 IEEE Jul. 25-27, 2005 pp. 184-194; Digital Object Identifier 10.1109/ESTS.2005.1524673.*

Modeling real-time distributed simulation message flow in an open network; Moen, D.M.; Pullen, J.M.; Distributed Simulation and Real-Time Applications, 2005. DS-RT 2005 Proceedings. Ninth IEEE International Symposium on; Oct. 10-12, 2005 pp. 97-104; Digital Object Identifier 10.1109/DISTRA.2005.29.*

Testing of shipboard power systems: a case for remote testing and measurement; Miu, K.; Ajjarapu, V.; Butler-Purry, K.; Niebur, D.; Nwankpa, C.; Schulz, N.; Stankovic, A.; Electric Ship Technologies Symposium, 2005 IEEE; Jul. 25-27, 2005 pp. 195-201; Digital Object Identifier 10.1109/ESTS.2005.1524674.*

2002 IEEE International Geoscience And Remote Sensing Symposium; Geoscience and Remote Sensing Symposium, 2002. IGARSS '02. 2002 IEEE International; vol. 3, Jun. 24-28, 2002 pp. 0_1-0_94.*

IGARSS'97. 1997 IEEE International Geoscience and Remote Sensing Symposium Proceedings. Remote Sensing—A Scientific Vision for Sustainable Development Geoscience and Remote Sensing, 1997. IGARSS '97. Remote Sensing—A Scientific Vision for Sustainable Development., 1997 IEEE Internationalvol. 3, Aug. 3-8, 1997;Digital Object Identifier 10.11.*

Remote Sensing—A Scientific Vision For Sustainable Development; Geoscience and Remote Sensing, 1997. IGARSS '97. Remote Sensing—A Scientific Vision for Sustainable Development., 1997 IEEE International; vol. 1, Aug. 3-8, 1997 pp. i-lxxi.*

The Ship Model for communication and mobility in distributed systems; Chanson, S.T.; Phillips, G.W.; Distributed and Networked Environments, 1994. Proceedings., First International Workshop on Services in; Jun. 27-28, 1994 pp. 98-105 Digital Object Identifier 10.1109/SDNE.1994.337772.*

Information content of compressed remotely sensed data;Brown, R.J.; Manore, M.J.; Bedard, D.; Hepburn, C.;Geoscience and Remote Sensing Symposium, 1994. IGARSS '94. Surface and Atmospheric Remote Sensing: Technologies, Data Analysis and Interpretation., Internationa; vol. 1, Aug. 8-12, 1994 pp. 320-322 vol. 1; Digital Object Identifier 10.1.*

Time Delay Insensitive Teleoperation; Paul, R.; Lindsay, T.; Sayers, C.; Intelligent Robots and Systems, 1992., Proceedings of the 1992 IEEE/RSJ International Conference on; vol. 1, Jul. 7-10, 1992 pp. 247-254.*

International Geoscience And Remote Sensing Symposium; Geoscience and Remote Sensing Symposium, 1992. IGARSS '92. International; May 26-29, 1992 pp. 0_3-130.*

Remote Sensing: Global Monitoring for Earth Management; Geoscience and Remote Sensing Symposium, 1991. IGARSS '91. Remote Sensing: Global Monitoring for Earth Management., International; vol. 3, Jun. 3-6, 1991 pp. i-lii.*

International Geoscience & Remote Sensing Symposium; Geoscience and Remote Sensing Symposium, 1992. IGARSS '92. International vol. 2, 1992 pp. 0_3-0_55.*

Office Action dated Jun. 30, 2003 for Norwegian Application No. NO20026284 with English translation.

Office Action dated Oct. 27, 2004 for Norwegian Application No. NO20026284 with English translation.

Office Action dated Aug. 3, 2004 for Norwegian Application No. NO20035861 with English translation.

Office Action dated May 19, 2004 for Norwegian Application No. NO20045039 with English translation.

* cited by examiner

Fig. 2
Known art:
F.A.T

Fig. 1
known art

Fig. 3, known art

SYSTEM AND METHOD FOR TESTING A CONTROL SYSTEM OF A MARINE VESSEL

CROSS REFERENCE OF RELATED APPLICATION

This application is a continuation of non-provisional patent application Ser. No. 10/541,036 filed Aug. 24, 2005, which is a 371 of PCT/NO2003/000445 filed Dec. 30, 2003, which is a PCT of Norwegian application Ser. No. 2002 6284 filed Dec. 30, 2002, the respective disclosures of which are incorporated here in by reference.

FIELD OF THE INVENTION

A control system can generally be seen as a system that gives control signals to a physical process, and that receives measurements from a device or a physical process or possibly from other physical processes. The measurements and an algorithm are used to compute the control signals so as for the physical process to run as desired. If the physical process is a motorized vessel, then the control system may receive measurements in the form of a vessel position, course and velocity, and can thereby calculate the control signals to propellers and rudders so that one or more of desired vessel position, course and velocity are achieved.

BACKGROUND OF INVENTION

Problem Description

The physical process, in this case in the form of a vessel, may be influenced by external events like a change in wind, waves and current, or by unexpected events like loss of motor power for one or more propellers, or failure in the function of a rudder. It is desired or expected that the control system for the vessel can handle external influence and external events so as for the vessel to maintain a safe state. A safe state may for example be that that the vessel maintains the desired position or velocity, or that it avoids undesired positions (to avoid collision or grounding), that it avoids a situation of uncontrolled drift, that it maintains a desired course, etc. Moreover, it is expected that the control system in the case of loss of sensor signals or errors in sensors should not do undesired and unfortunate compensations like a sudden change in ballast pumping in response to loss of a realistic signal in a roll or pitch sensor, or sudden corrections of an apparent error in position.

Measurements to a Control System

Figure 1:
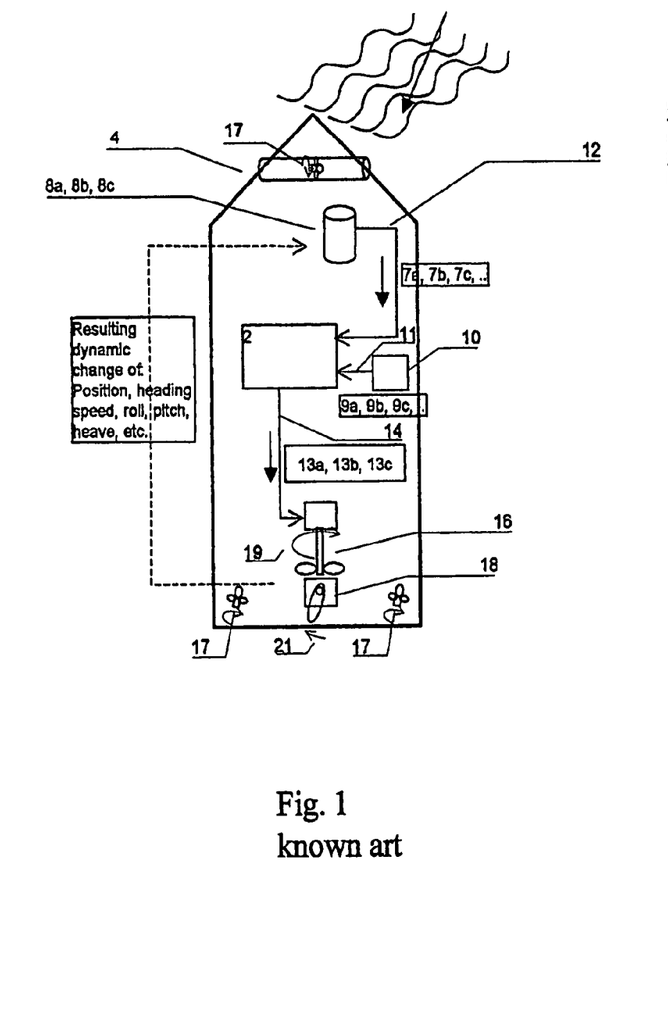
FIG. 1 illustrates a vessel with a control system. The control system receives measurements of position, course and velocity from navigational instruments and receives commands from a position specification device, the control panel of the control system, a velocity specification device, and a velocity or shaft speed specification device for the propeller or for possible thrusters. The control system can also receive measurements of relative wind direction and relative wind speed form an anemometer, and it can receive or calculate information about sea state, that is, wave elevation, roll period, pitching, etc. The control system can be designed to sequentially output shaft speed to propellers and angles to rudders so that the desired position, course and velocity are achieved.
Figure 2:
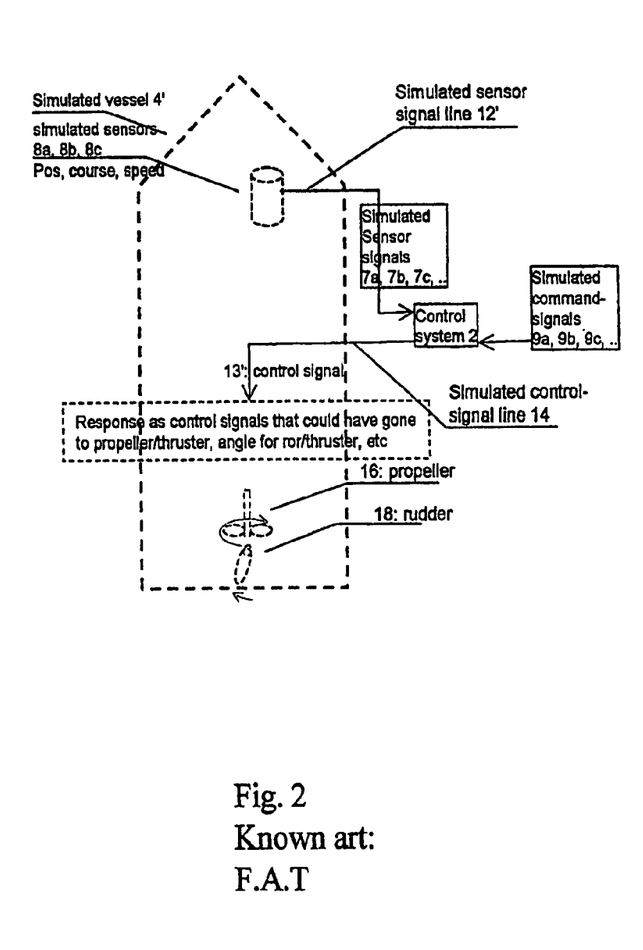
FIG. 2 illustrates a FAT of a control system for a vessel, where the control system is connected to an interface with simulated sensor signals and where the control system gives response in the form of control signals to (not connected) actuators.
Figure 3:
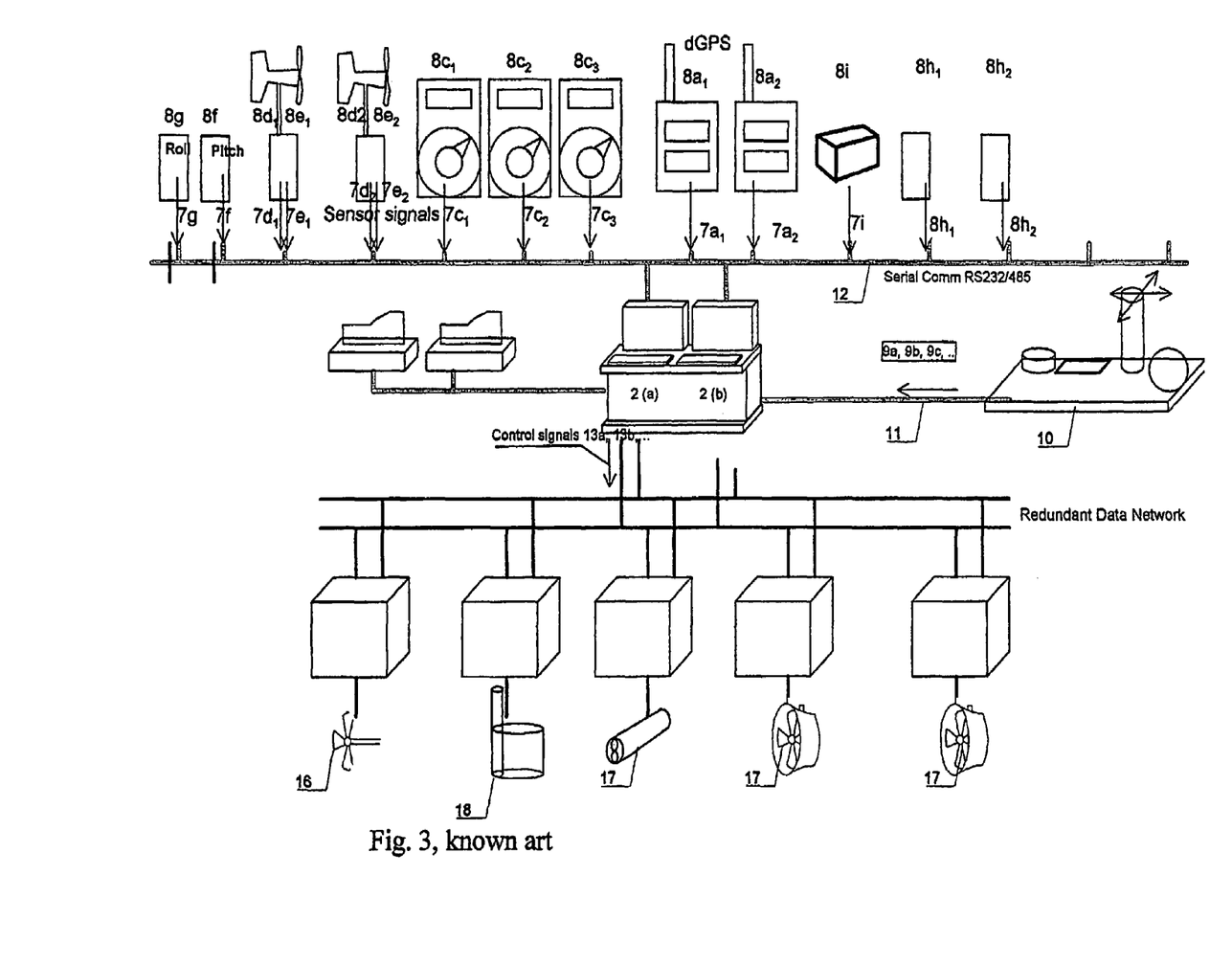
FIG. 3 illustrates a known control system for a ship, with the connected sensors, command input devices and actuators of the control system.

A control system for a ship, with inputs from instruments that give measurements, and with outputs to actuators, propelling devices and control devices that are to be given control signals, is shown in FIG. 1 and in FIG. 3. This type of control system can receive measurements in the form of sensor signals from a number of sources: roll/pitch/heave sensors, anemometer for measuring relative wind speed and direction, gyro compass, GPS sensors or GPS positioning systems, inertial navigation systems that on basis of acceleration measurements calculate velocity by integration with respect to time and position by double integration with respect to time, hydroacoustic position sensors relative to fixed points at the sea-floor, taut-wire system of which the direction and length of one or more tensioned wires from the vessel to points at the sea floor is observed, command signals for change of course or desired course, desired position, or desired velocity of the vessel, shaft or and load on propellers and motors, rudder angle sensor, level sensors for loading tanks, ballast level sensors, fuel level sensors, engine state, cooling water temperature, oil pressure, etc.

The control system is to give control signals to actuators like propulsors and control devices. The propulsors may be ordinary propellers, tunnel thrusters or azimuth thrusters, or in some cases, a mooring system that is designed to pull the vessel to the right position. Control signals can also be given to ballast pumps and associated valves to correct the roll angle or the pitch angle.

Problems Related to Control for Dynamic Positioning, DP.

If the vessel is a petroleum drilling vessel or a petroleum production vessel, for example a drilling ship or a drilling platform, a petroleum production ship or a petroleum production platform, the control system may also receive measurements of the heave motion from a heave accelerometer, and output a control signal to an active heave compensation system for a riser, a drill string, cranes, etc. where mechanical equipment may be connected to the seafloor and of which it may be essential to compensate for the motion of the vessel, in particular heave. A normal use of control systems for petroleum activity at sea is for dynamic positioning of the vessel, that is, that the vessel uses actuators like azimuth thrusters to maintain desired position during drilling or during production of petroleum. A vessel that is moored and may rotate about a rotating turret with mooring lines to the seafloor may also have a control system that gives a varying control signal to propellers or thrusters to assist in keeping the desired position when the vessel is rotated because the direction of the weather or current changes, so that the thrusters contribute with forces to compensate for changes in the tension of mooring lines when the forces turn. Similarly, it may be envisaged that that the control system can give control signals to increase or decrease tension in the mooring lines of the same reason.

Problems Related to Testing of Control Systems of Vessels.

A ship inspector can visit a vessel and conduct a test on board of the control system. The test on board can be performed by disconnecting or connecting sensor systems, and to monitor the response of the system in different failure situations. However, to make a realistic test of the vessel for conditions that are to be expected, it is necessary to wait for or to seek weather situations and sea states that rarely occur or that can be dangerous. It will hardly be considered as an option to expose the vessel to extreme situations, like abnormally large errors in ballast distribution. In order to check if the control system provides control signals for correct compensation of the error, such kind of tests will normally not be conducted.

It is possible to perform a simulation of sensor data to the control system on board and monitor which control signals that the control system gives to actuators like propellers, rudders and thrusters, but this requires a local interconnection of the control system to a test system and is not done presently as far as the applicants knows. A disadvantage of visiting the vessel to be tested is often related to a long way of travel for the ship inspector, that the ship inspector must bring equipment for interconnection to the control system inputs for measurements, and equipment for interconnection to the control system outputs for response in the form of control signals that are normally sent to the actuators of the vessel, and in addition a data library that at least has to include the configuration of the actual vessel to be tested. Moreover, the travel time from a vessel that is to be tested and certified, to a next vessel, can make it difficult for the inspector to perform inspections sufficiently quickly, so that the next vessel will have to wait longer than necessary, with the economic disadvantages caused by the waiting, if the vessel cannot be taken into use without testing and certification. It may also cause a concealed physical danger to use a vessel where lack of testing of the control system does not reveal possible errors.

This means that there is a need for more efficient testing of vessel control systems, in particular because the vessels can be geographically remote from each other, and in practice not easily accessible for an inspector.

In factory production of a control system it is usual to perform a so-called factory acceptance test (FAT) of the control system (including hardware and software) where the manufacturer feeds simulated sensor data to the control system and monitors the control signals the control system gives in response. This type of FAT can only reveal errors where measurements from sources that the manufacturer has foreseen to exist, and where the control signals are only for equipment that the manufacturer have foreseen. Thus, it will not be known with certainty how the control system will interact with equipment, systems, configurations or situations that the manufacturer of the control system has not foreseen. In addition, in a FAT the control system will not be tested in the actual constellation where the control system is installed and connected for use on the vessel.

Example of a Practical Problem in Dynamic Positioning.

In dynamic positioning of a vessel (4) that is held in desired position by propellers, rudders or thrusters of the tunnel or azimuth type, it may be essential for the operation that the vessel keeps its position. Several events may be undesired. One may experience loss of motor power for one or more propellers or rudders, and have to increase the motor power on the remaining propellers and/or thrusters and perhaps rotate the remaining rudders or thrusters. One may also experience serious errors where the control system loses some of the signals from the connected sensors so that an undesired incident may occur. The inventors have knowledge of an instance where a vessel, in this case an drilling platform, was lying at a fixed position in the open sea and was drilling a drilling hole for a petroleum well in the seafloor, where the drilling platform held the desired position by means of so-called dynamic positioning or "DP", that is, the control system was tuned to hold the vessel in the desired position by means of position measurements and motor power, without the use of mooring lines to the seafloor. The drilling platform was equipped with a double set of DGPS receivers that calculate the geographic position of the vessel based on radio signals received from a number of navigation satellites. In addition the drilling platform was equipped with a double set of hydroacoustic position sensors that measured the position of the vessel with respect to transponders at fixed points on the seafloor. At a given time during drilling, with riser connection to the drilling hole and active drilling, an event occurred so that the DGPS receivers showed a sudden change in position of about 75 meters, although no such change in position had actually occurred. The hydroacoustic sensors showed a stable position at the desired position over the drill hole. The control system continued to control propellers and rudders, and the drilling platform was without interruption held at the correct dynamic position, on basis of the signals. However, it turned out that after 5 minutes the drilling platform suddenly started to move towards the desired position according to the then erroneous DGPS signals. It was necessary to discontinue the drilling with the associated emergency procedures that among other things involved disconnection of the riser and cutting of the drill string. This type of situation can involve a risk for blowout of gas and oil, or pollution by spilling of drilling fluid. This type of situation can also present a risk to vessel and crew. This type of discontinued DP-drilling may thus be very expensive to start up again. The applicants assume that the initial sudden change of the position calculated by the DGPS receivers can have been caused by disturbances in the signal transmission from the GPS satellites to the receivers, or by a situation with an insufficient number of available satellites. The loss of the DGPS signal can have been ignored by the control system because of quality conditions in the software of the control system that require that such a calculated position must have been stable in the preceding 5 minutes to be considered to be real. In this way sudden changes in position due to erroneous signals are avoided. However, the new and changed, but nevertheless stable position calculated from the DGPS receivers can after 5 minutes have been regarded as stable and therefore reliable by the control system, and may have been given a higher priority than the measurements from the hydroacoustic transponders. This may be the reason why the control system attempted to control the drilling platform to the new position that the control system had evidently interpreted as the desired position, although drilling was in progress and the hydroacoustic measured position indicated that the position should be kept unchanged.

Problems Related to Changed Configurations in a Vessel: Reprogramming of a Control System After a control system has been put to use in a vessel there will in many cases be a need for reprogramming or modification of the software in the control system. The purpose for doing this can be a need for changing numerical values related to alarm limits and acceptable variation in a sensor signal in the algorithm of the program, or it can be a need for the introduction of new tests and functions in the control system. When the reprogramming or modification of the software is completed there is a need for testing the control system to see if the changes have given the intended effect, and to check whether new and unintended errors have appeared as a consequence of the modifications. At present, satisfactory test equipment and procedures are not available for the testing of the control systems on a vessel after such changes.

Modifications in an Existing Control System, E.G. when Replacing Cranes.

Marine operations, related to oil and gas exploration and production, are made by vessels with cranes for installation and replacement of modules on the seafloor. This type of crane has control systems that compensate for the vertical motion of the vessel. The mode of operation and the function of the crane in safety-critical situations will to a large extent depend on the detailed design of the software of the control system, which will vary from one crane to another. Procedures have been established for the testing of the mechanical design of such cranes. In contrast to this there are no established systems or methods for the testing of the software of the crane control systems. The reason for this is that the response of the crane will depend on the sea state and the motion of the vessel in addition to the mechanical design and the control system of the crane. A required detailed testing of a crane system on a vessel should therefore involve both the dynamics of the vessel including the relevant control systems of the vessel, and in addition, the dynamics of the crane including the control system of the crane.

Repair/Replacement of Sensors for a Control System.

When sensors for a control system are replaced or modified, there is a need for adjustment of alarm limits for limits for acceptable variations in the sensor signals. It is customary for a control system to have redundant sensor systems so that several sensors may be used to measure the same physical quantity. As an example of this, the position of a vessel can be measured by inertial sensors, two or more GPS-receivers and two hydroacoustic sensor systems. From these measurement data the position of the vessel is determined by means of an algorithm in the control system. This algorithm will depend on the properties of the various sensors with respect to accuracy and properties like long term stability versus accuracy under rapid position variations. Replacement or modification of a sensor introduces the need for testing of the total sensor system to investigate whether the resulting combination of sensors provides acceptable position measurements for use in a control system.

Repair/Modification/Replacement of Actuators.

After replacement or modification of an actuator, a control system may give a significantly different response for the vessel. The reason is that a new or modified actuator may give a different control action to the vessel than what was assumed in the development of the control system. An example of this is in the use of thrusters for dynamic positioning, where the relation between the shaft speed of the thruster and the thrust must be known when the control system is tuned. If a thruster is changed, then the relation between the shaft speed of the thruster and the thrust may be changed, and it will be necessary to test the vessel with the control system to investigate if the system still performs satisfactorily.

Thus there is a need for a more effective testing of vessel control systems, also in the cases where the vessel has been modified from its previous configuration, and where old and new components of the vessel have not been previously combined, and has to be tested in the new combination.

Known Art in the Field.

The U.S. Pat. No. 6,298,318 "Real-time IMU signal emulation method for test of guidance navigation and control systems" describes an emulation method for testing of a plane by emulating the motion using a so-called 6 degrees-of-freedom (6 DOF) flight simulator and where signals from a so-called inertial navigation module to a guidance, navigation and control system on board the aircraft are generated by simulation. This U.S. patent does not discuss problems related to dynamic positioning of a vessel in drilling operations or some other form of stationary operation, it does not mention the use of cranes, navigation of connected underwater equipment, integration of hydroacoustic positioning equipment, problems related to ballasting, and does not consider ocean waves. A ship will normally not have 6 DOF, but instead 3 DOF as it has restoring action in heave/roll/and pitch motion.

The U.S. Pat. No. 5,023,791 "Automated test apparatus for aircraft flight controls" describes an automated test apparatus for the testing of flight control systems of an aircraft as part of an integrated system for testing a plurality of flight control systems. The automated test apparatus includes a system controller having memory for storing programmed instructions that control operation of the automated test apparatus, and for storing resulting flight controls system test data. The automated test apparatus includes a keyboard, a touch-screen, and a tape drive for entering programmed instructions and other information into the automated test apparatus, and for outputting test data from the system controller. Instruments included in the automated test apparatus and controlled by the system controller generate test signals that are input to the aircraft's flight controls system, and monitor resulting test data signals that are produced by the flight controls system. The automated test apparatus is connected by an interface cable to an onboard central maintenance computer included in the aircraft. The central maintenance computer includes a non-volatile memory that is programmed to run onboard tests of the flight controls system, and is controlled by the system controller during testing in accordance with the programmed instructions to run the onboard tests.

U.S. Pat. No. 5,541,863 "Virtual integrated software testbed for avionics" describes a virtual integrated software testbed for avionics which allows avionics software to be developed on a host computer using a collection of computer programs running simultaneously as processes and synchronized by a central process. The software testbed disclosed uses separate synchronized processes, permits signals from an avionics device to be generated by a simulation running on the host computer or from actual equipment and data bus signals coming from and going to actual avionics hardware is connected to their virtual bus counterparts in the host computer on a real-time basis.

U.S. Pat. No. 5,260,874 "Aircraft flight emulation test system" describes an aircraft test system that generates stimuli that emulate the stimuli received by an aircraft when in flight. The aircraft test system includes a number of instruments for generating the number of processor-controllable instruments for generating stimuli received by an aircraft when in flight. The system also includes a number of instruments that monitor the response of the various aircraft components to the stimuli to which the aircraft is exposed. A processor in response to the output signal from the aircraft components directs the stimuli generating instruments to produce stimuli that emulate those received by the aircraft as it moves through the air. The system thus generates an initial set of stimuli similar to what an aircraft would be exposed to when in flight; monitors the response of the aircraft to the stimuli to which it is exposed; and, in response generates an updated set of stimuli to the aircraft. The system also records the response of the output responses of aircraft components so that they could be monitored by personnel charged with insuring that the aircraft is functioning properly. The system can also be used to train flight crews since it can be used to place the aircraft "in the loop" during a flight emulation.

U.S. Pat. No. 6,505,574 "A vertical motion compensation for a crane's load" describes a method and a system for reducing sea state induced vertical motion of a shipboard crane's load using winch encoders, boom angle sensor, turning angle sensor and motion sensor that all feed measurements into a central processor that controls the crane on basis of the measurements and the commands from a crane operator.

SUMMARY OF THE INVENTION

A solution to the problems described above in connection with testing of control systems for ships is, according to the invention, a method for testing of a control system in a vessel, where the control system involves control and monitoring of the vessel with control signals to one or more actuators, where the method comprises the following steps:

acquisition in real time of sensor data to the control system from one or more sensors over a first sensor signal line to the control system;

computation in a control algorithm in the control system on basis of one or more of the acquired sensor data and command signals, and sending of the control signals over a third signal line to the actuators.

Disconnection of one or more sensor signals from one or more of the sensors or of command signals from one or more of the command input devices, so that the selected sensor signals or command signals are not sent to the control system, and replacement of one or more of the disconnected sensor signals or command signals, by corresponding simulated sensor signals or command signals that are generated in a remote test laboratory with respect to the vessel and sent over a communication line through one or more of the signal lines to the control system;

continued computation in the control system on the basis of real and/or simulated sensor signals of control signals, and transmitting the control signals over a communication line to the remote test laboratory.

The method may optionally include acquisition of command signals to the control system from a command input device over a second signal line or command signal line to the control system and the continued computation on the basis of real and/or simulated command signals of control signals.

In a preferred embodiment of the invention the method will include simulation in a simulator in the remote test laboratory by means of an algorithm of the dynamic new state of a vessel on basis of the control signals.

Additional steps of the method of the invention are found in the dependent patent claims.

When the testing of the control system is completed, the communication line between the vessel and the remote test laboratory is disconnected, and the sensors and the command input devices are connected to the control system in the regular way, and the control system outputs for control signals are connected to the actuators, for normal operation of the control system in the vessel.

The invention also includes a system for testing of a control system in a vessel, where the control system is arranged to control and monitor the vessel, comprising the following steps:

one or more sensors on board the vessel arranged to send one or more sensor signals over a signal line to the control system, command input devices on board the vessel arranged to send desired position, course, velocity etc. over a command signal line to the control system, an algorithm in the control system for the computation of control signals to the vessel actuators on basis of sensor signals, command signals, for sending of the control signals over a signal line to the actuators, in which the novelty of the system comprises the following steps:

one or more communication lines for transmission of one or more simulated sensor signals and/or simulated command signals from a remote test laboratory to the control system;

a simulator including an algorithm for the simulation of a new dynamic state of a vessel model based on a previous state, control signals, and dynamic parameters of the vessel, where the communication line is arranged for transmitting back the new simulated state of the vessel model in the form of simulated sensor signals to the control system, for continued computation in the control system on basis of the real and/or simulated sensor signals or real and/or simulated command signals, of control signals to achieve at last one of desired position, course, velocity etc., and where the communication line is arranged to transmit the response of the control system in the form of control signals as control signals to the remote test laboratory.

BRIEF DESCRIPTION OF THE DRAWINGS

The invention is illustrated in the enclosed drawings in FIG. 1 to FIG. 7. The drawings are meant to illustrate the invention and shall not be construed to restrict the invention, which shall only be restricted by the attached claims.

FIG. 4c illustrates a vessel where a set of sensors for pitch, roll, wind speed, wind direction, GPS position sensors, DGPS position sensors, hydroacoustic position sensors, etc., that are normally arranged to give measurements to the control system of the vessel, are replaced by simulated measurements from a remote test system via one or more communication lines, and where the control system responds to the simulated measurements where the response would normally give control signals to the actuators of the vessel, like e.g. propellers, rudders, tunnel thrusters, azimuth thrusters, and where the response is sent via a communication line to a remote test laboratory where a vessel simulator e.g. in the form of an algorithm calculates a the dynamic behavior of a simulated vessel in response to the control signal from the remote control system in the vessel, and sends the new state of the vessel back to the remote system, for a new response in the form of updated control signals, etc.

DETAILED DESCRIPTION OF THE PREFERRED EMBODIMENTS

Figure 4A:
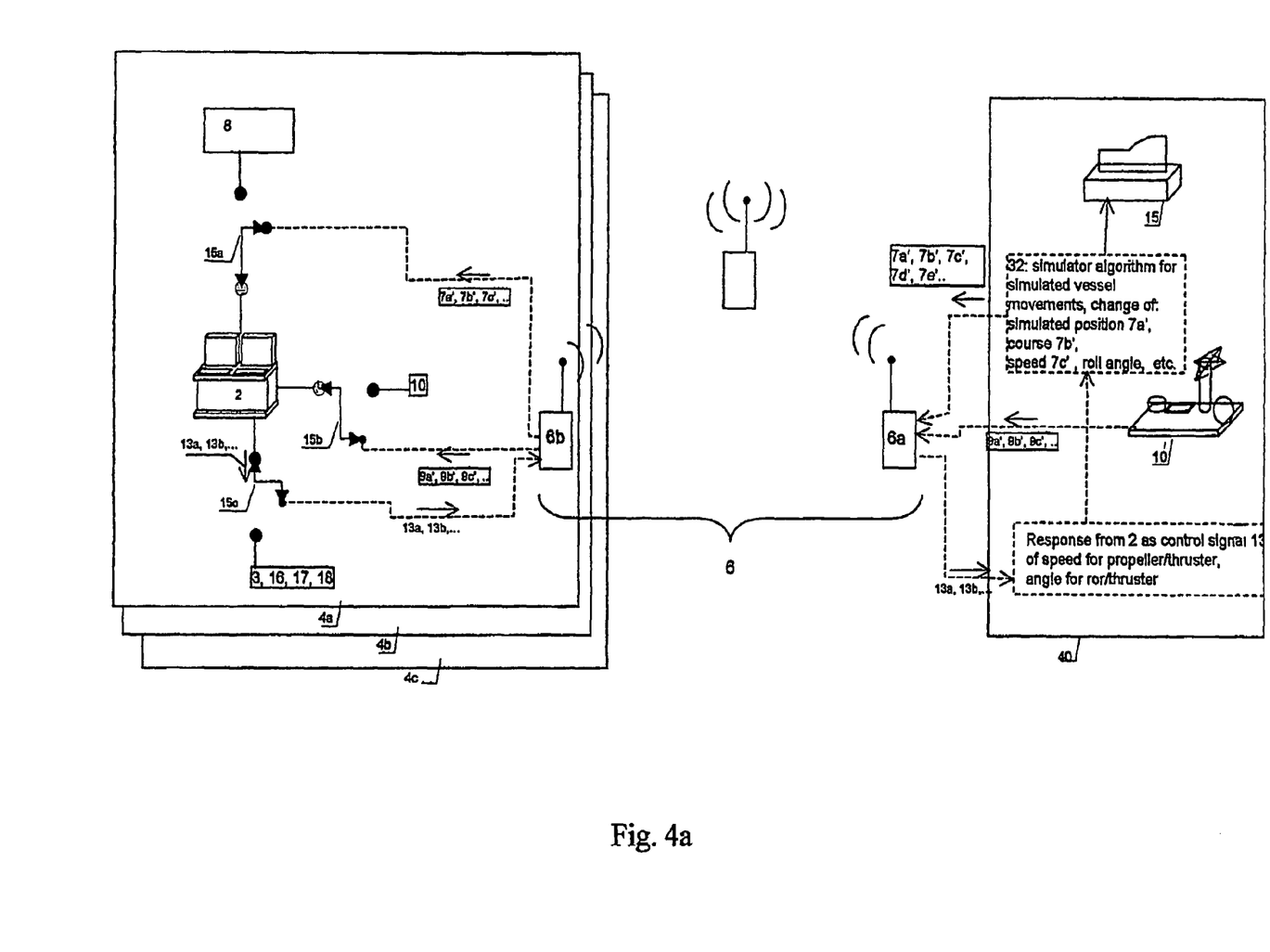
FIG. 4a illustrates the basic idea of the invention, in which a vessel simulator is arranged in a remote simulator location, with a logger, both connected through a first real-time interface at the simulator location, with one or more communication channels for real-time control, simulation and logging, to one or more real-time interfaces for real-time control, simulation and logging which is further connected to a control system, e.g. a control and monitoring system on at least one vessel. The simulator location may be e.g. at a so-called class society on land.
Figure 4B:
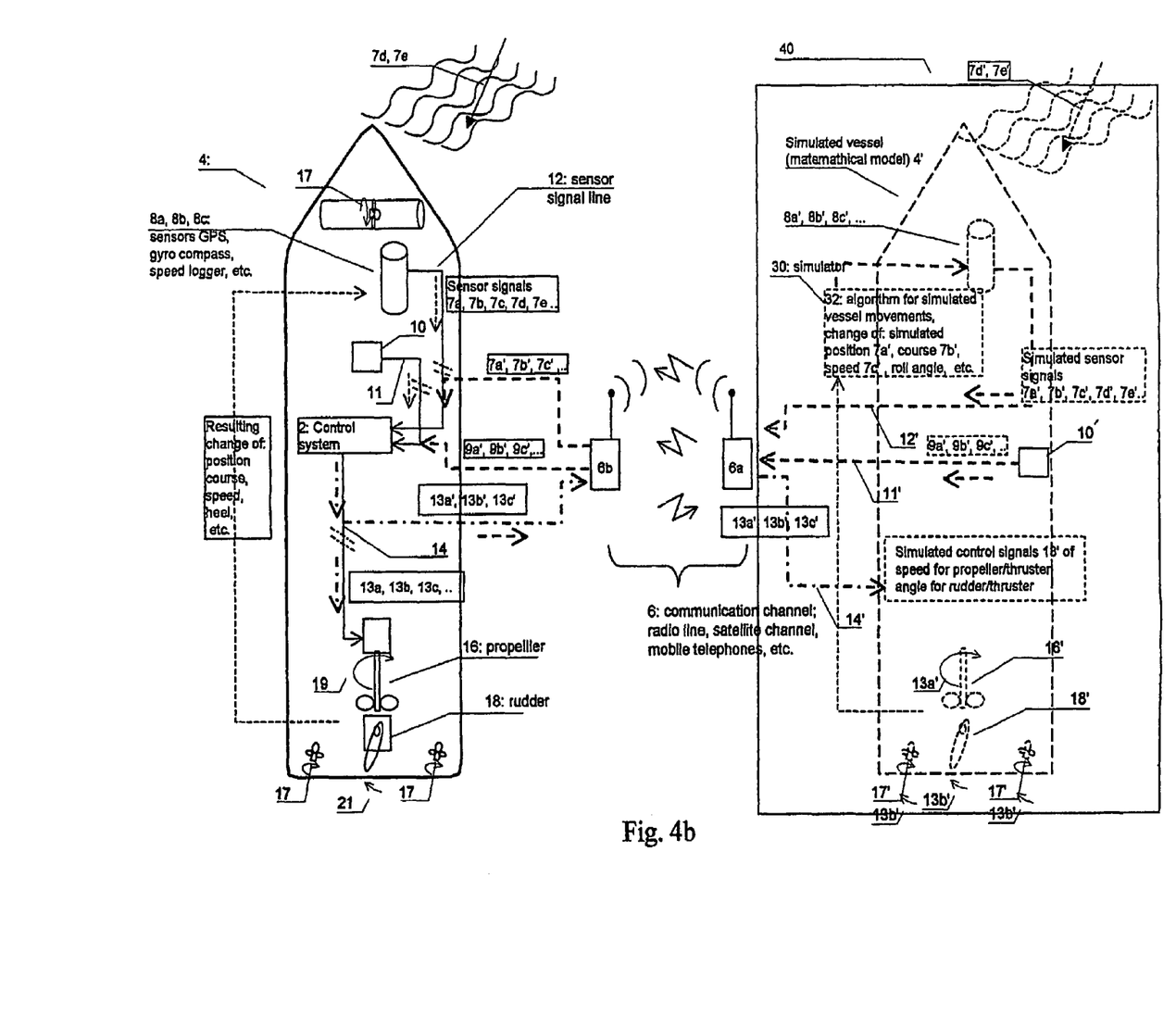
FIG. 4b illustrates a vessel with a control system where one or more of the real sensor signals are replaced by simulated sensor signals over a communication line to and from a test laboratory, and where one or more of the control signals from the control system to the actuators of the vessel are sent back over a communication line to the test laboratory, preferably instead of being sent to the actuators of the vessel.
Figure 4C:
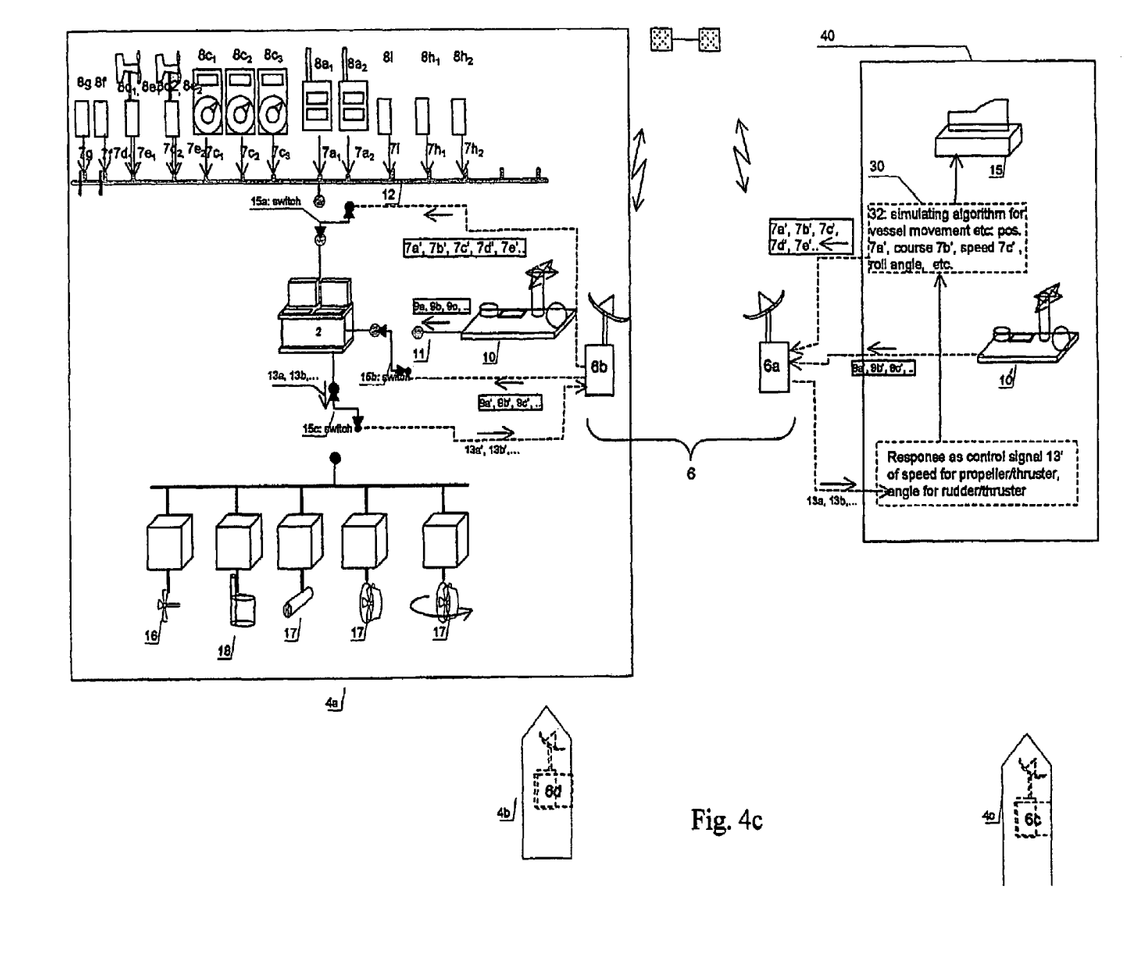

The invention includes a system for and a method for testing of a control system (2) on a vessel (4), e.g. a ship, a drilling platform, a petroleum production platform, in real time over a communication channel (6), as shown in an overview in FIG. 4a, and in more detail in FIGS. 4b and 4c. The control system (2) may include control and monitoring of the vessel (4). Testing of the control system (2) may include the simulation of normal states and extreme states and normal changes to such normal and extreme states for the vessel (4), for example ordinary movement in a simulated calm sea state $H_1$. In addition, one may simulate ordinary movement in a simulated extreme sea state $H_2$, failure situations with e.g. loss of motor power on a single propeller (16) where the vessel has only this single propeller (16), with subsequent dynamic simulation of rotation away from a desired course (7b) and drift away from a desired position (7a). One may also simulate the loss of one or more propellers (16) where the vessel (4) has one or more propellers (16) that still functions, and study how the vessel will react to the loss of one or more propellers.

In the following a brief description is given of the system as a material device illustrated in FIGS. 4a, b and c, for intervention from a remote laboratory (40) to control systems (2) in one or more vessels (4a, 4b, 4c, ...).

The system according to the invention is arranged for the testing of a control system (2) in a vessel (4), where the control system (2) is arranged to control and monitor the vessel (4). The system according to the invention comprises the following features:

One or more sensors (8) arranged on board the vessel (4) are arranged to send one or more sensor signals (7) over a signal line (12) to the control system (2).

Command input devices (10) on board the vessel (4) are arranged to send a desired position, course, velocity (9) etc. over a command signal line (11) to the control system (2).

An algorithm in the control system (2) is arranged for computing control signals (13) to the vessel actuators (3) based on the sensor signals (7) and/or the command signals (9), for sending of the control signals (13) over a signal line to the actuators (3).

One or more communication lines (6) is arranged to send one or more simulated sensor signals (7') and/or simulated command signals (9') from a remote test laboratory (40) to the control system (2). The remote laboratory may be on land, and equipment for real-time communication must be available both in the laboratory and on each vessel that is to be tested.

The remote laboratory includes a simulator (30) including an algorithm (32) for the simulation of the new dynamic state (7') of a vessel model (4') based on previous state (7, 7'), control signals (13, 13'), and dynamic parameters for the vessel (4).

The communication line (6) is arranged for sending back the new simulated state of the vessel model (4') in the form of sensor signals (7') to the control system (2), for continued computation in the control system (2) on basis of the real and/or simulated sensor data (7, 7') or real and/or simulated command signals (9,9'), of control signals (13) to achieve at least one of desired position, course, velocity etc.

The communication line (6) is arranged for sending of the response of the control system (2) in the form of the control signals (13) as control signals (13') to the remote test laboratory (40).

The control signals (13) include signals (13a, 13b, 13c) in the form of shaft speed (13a, 13b) for one or more propellers (16) or thrusters (17), and rotation angles (13c) for rudders (18) or thruster (17) and possibly other actuators.

The sensors (8) include one or more of the following:

position measuring devices (8a), to determine the vessel position (7a), such as GPS receivers (8a), hydroacoustic position sensors (8h), integrating acceleration sensors, etc.;

course measuring devices (8b), to determine the vessel course (7b), e.g. a gyrocompass or some other compass.

a speed sensor (8c) or single integrating acceleration sensor to determine the velocity (7c);

an anemometer (8d, 8e) to indicate the (relative) wind speed (7d) and wind direction (7e);

a roll angle sensor (8f) to indicate the roll angle (7f);

a pitch angle sensor (8g) to indicate the pitch angle (7g).

In a preferred embodiment of the invention the system is equipped with a knob or switch (15a) arranged to disconnect one or more sensor signals (7) from the signal line (12) to the control system (2). In addition, the system according to the invention may be provided with a second switch (15b) arranged to disconnect one or more of the command signals (10) from the signal line (11) to the control system (2), and also provided with a third switch (15c) arranged to disconnect one or more of the control signals (13) from the signal line (14) from the control system. In this way the switches (15) can be used to fully or partially isolate the control system (2) from signals to and from the rest of the vessel. The control system (2) can still be connected to the regular electrical power supply on board.

The system implies as usual that the dynamic parameters of the vessel enter into the algorithm of the control system (2) for the computation of the control signals (13) to the actuators (3).

According to a preferred embodiment of the invention the system is arranged so that the remote test laboratory (40) is equipped with a simulator (30) with an algorithm (32) arranged to simulate the state of a vessel on basis of an initial state represented by completely or partially simulated measurements (7, 7') and control signals (13, 13') from the control system (2).

According to a preferred embodiment of the invention the communication line (6) is arranged for sending of one or more simulated sensor signals (7') from the remote test laboratory (40) which further is arranged to be connected to and disconnected from a first real-time interface (6a), on the remote test laboratory (40). In the same way the communication line (6) may be arranged for being connected to and disconnected from a second real-time interface (6b) on the vessel (4), and where the second real-time interface is arranged for being connected through the switch (15b) to the signal line (11) to the control system (2).

According to a preferred embodiment of the invention a simulated command input device (10') is arranged for sending of simulated command signals (9') from the remote test laboratory (40) over the real-time interface (6a), and over the communication line (6) and over the real-time interface (6b) to the control system (2).

The system can be arranged so that all of or parts of the algorithm in the control system (2) can be modified, calibrated, or replaced, over the communication line (6) from the remote test laboratory. According to the invention the test laboratory includes a data logger (15) for logging of the response (13') from the control system (2) to the measurements (7, 7').

Description of the Method for Testing of the Control System.

The system described above is arranged for being used in a method for testing of a control system (2) in a vessel (4). The control system (2) includes control and monitoring of the vessel (4) with control signals (13) to one or more actuators (3). The method according to the invention comprises the following steps:

Acquisition in real time of sensor signals (7) to the control system (2) from one or more sensors (8) over a first sensor signal line (12) to the control system (2).

Acquisition of command signals (9) to the control system (2) from a command input device (10) over a second signal line or command signal line (11) to the control system (2).

Computation in a control algorithm in the control system (2) on basis of one or more of the acquired sensor signals (7) and command signals (9), and the dynamic parameters of the vessel, and sending of the control signals (13) over a third signal line (14) to the actuators (3).

The novelty of the invention involves the disconnection of one or more sensor signals (7) from one or more of the sensors (8) or of command signals (9) from the command input devices (10), so that the selected sensor signals (7) or command inputs (9) do not reach the control system (2), and at the same time replacement of one or more of the disconnected sensor signals (7) or command signals (9), with corresponding simulated sensor signals (7') or command signals (9') that are generated on a remote test laboratory (40) with respect to the vessel (4). The simulated signals (7', 9') are sent over a communication line (6) through one or more of the signal lines (12, 14) to the control system (2) from the remote test laboratory.

Computation of the control signals (13, 13') will continue in the usual way in the control system (2) on basis of real and/or simulated sensor signals (7a or 7a', 7b or 7b', 7c or 7c', . . . ) or command signals (9a or 9a', 9b or 9b', 9c or 9c', . . . ).

The control signals (13') that are generated by the control system can then be sent over the communication line (6) to the remote test laboratory (40).

According to a preferred embodiment of the method the method will then include simulation in a simulator (30) in the test laboratory (40) by means of an algorithm (32) of a new dynamic state of a vessel model (4') on basis of the control signals (13'). In this way a test on the control system (2) can be performed from the remote test laboratory (40) on a vessel independently of where the vessel is placed in the world. The simulation algorithm must take into account the time delay caused by the use of the communication line (6).

According to the method according to the invention the remote test laboratory (40) that is involved in the testing of the control system can be located on land, and the vessel (4a, 4b, 4c, . . . ) that is tested is a long distance away from the test laboratory, typically between 1 and 20000 km, and where the vessel (4a, 4b, 4c, . . . ) that is tested is in a nearby harbor, in a distant harbor, in a dock or in a yard, at anchor, or in the open sea.

When the testing of the control system is completed, the communication line between the vessel and the remote laboratory is disconnected, and the regular sensor signals and the regular command signals to the control system are reconnected, and the control signals from the control system are reconnected to the actuators, for normal operation of the control system in the vessel.

According to the preferred embodiment of the invention the sensor signals (7) comprise one or more of the following sensor parameter from sensor (8):

The vessel position (7a) from position sensors (8a), such as GPS-receiver (8a), hydroacoustic position sensors (8h), integrating acceleration sensors, etc.

course (7b) from course sensors (8b), e.g. a gyrocompass or another compass, velocity (7c) from a velocity sensor (8c) or a single-integration acceleration sensor;

wind speed (7d) and wind direction (7e) from an anemometer (8d, 8e), roll angle sensor (7f) from a roll sensor (8f), pitch angle sensor (7g) from a pitch sensor (8g).

According to the preferred embodiment of the invention the control signals (13) include signals (13a, 13b, 13c) in the form of shaft speed of one or more propellers (16) or thrusters (17), and angles for rudders (13c) or thrusters (17) and possibly other control devices to achieve one or more of desired position (9a), course (9b), velocity (9c).

The method may be used to calculate control signals to one or more propellers (16), and control devices (18) may include one or more rudders (18a, 18b), and it may include one or more thrusters (17).

The command input device (10) will at least include a position specification device, a steering wheel, a velocity specification device, or a device for specification of desired inclination angle, pitch angle, heave compensation, etc. that give a command signal (9) of one or more of desired position (9a), desired course (9b), and desired velocity (9c) or another desired state, e.g. desired roll angle, desired pitch angle, desired heave compensation, etc.

According to a preferred embodiment of the invention the method includes that the remote test laboratory (40) is used to verify that the control system (2) on basis of the simulated sensor signals (7') in the test, and possibly remaining real sensor signals (7), the simulated command signals (9) and possibly remaining real command signals (9) gives control signals (13, 13') that will lead to a desired state of the vessel, and where the control system (2) is certified on basis of this test.

The dynamic parameters of the vessel may involve the mass (m), the axial moments of inertia, and the mass distribution of the vessel, the hull parameter that describe the geometry of the hull, as explained below. Disconnection of the sensor signals (7) from the sensors (8) to the control system (2) can be done by means of a switch (15a) on the signal line (12). Disconnection of command signals (9) from the command input devices (10) to the control system (2) may be made by means of a switch (15b) on the signal line (11).

According to a preferred embodiment of the method according to the invention, failure situations can be tested by disconnection of one or more of selected sensor signals (7) or command signals (9) at a time to simulate breakdown of components, and where the response of the control system (2) in the form of control signals (13, 13') and status signals (19) are logged in a logger (15) in the test laboratory (40).

Failure situations can also be tested by changing measurements or by generating disturbances in selected sensor signals (7'), or by generating external disturbances like weather, wind, electrical noise to the measurements (7') that are sent from the remote test laboratory (40) to the control system (2) in the vessel (4), and where the response of the control system (2) in the form of control signals (13, 13') and status signals (19) are logged on a logger (15) in the test laboratory (40) According to a preferred embodiment of the method according to the invention new software for the control system (2) in the vessel (4) can be transmitted from the test laboratory (40) over the communication line (6).

Figure 8:
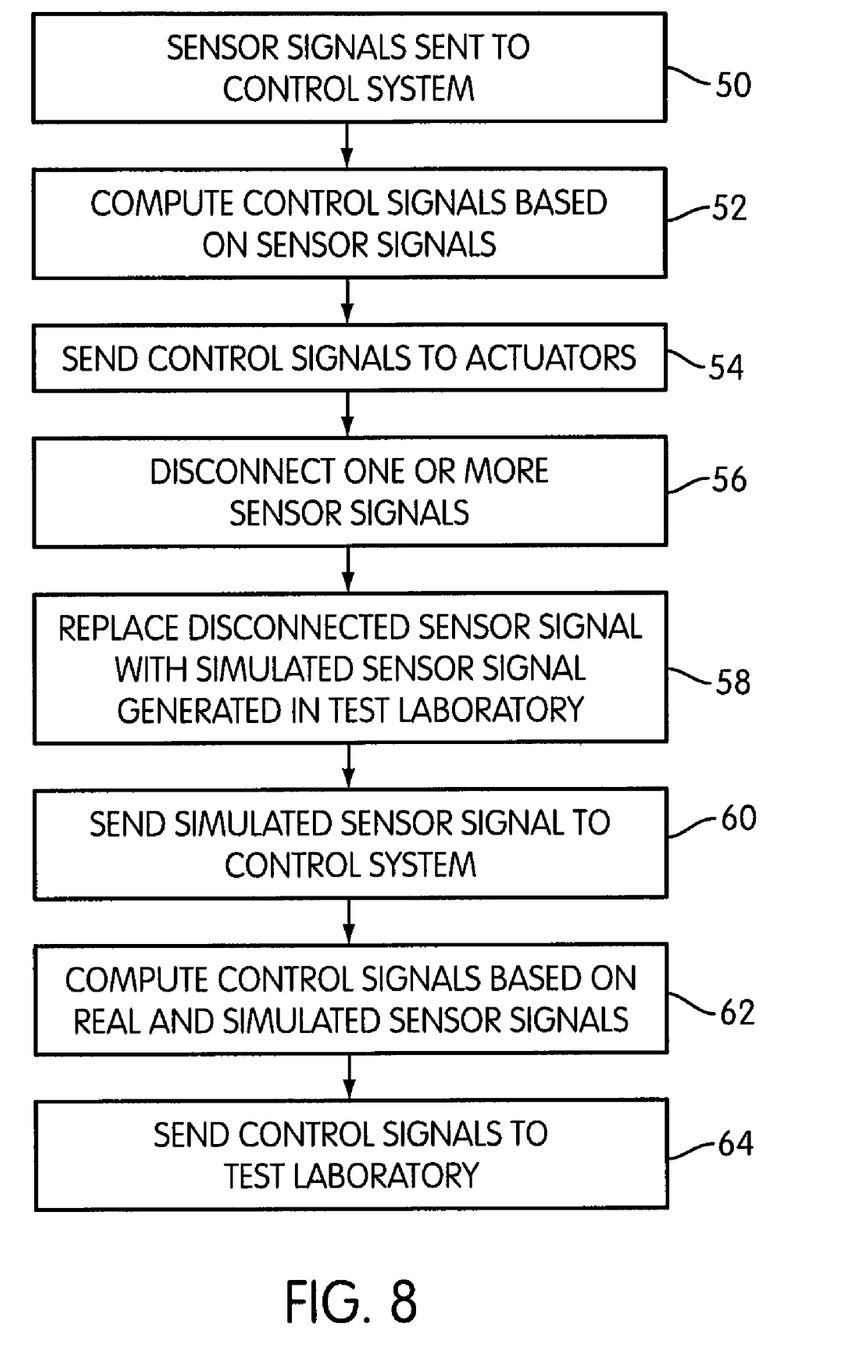
FIG. 8 is a flow chart showing a process embodying aspects of the present invention.

A method for testing a control system of a vessel embodying aspects of the present invention is illustrated by a flow chart in FIG. 8. In step 50, one or more sensors send one or more sensor signals in real time over a sensor signal line to the control system. In step 52, a control algorithm in the control system computes control signals based on one or more of the sensor signals, and in step 54, the control signals are sent over a control signal line to the actuators. In step 56, one or more of the sensor signals from one or more of the sensors is disconnected so that the disconnected sensor signals do not flow to the control system. In step 58 the one or more disconnected sensor signals are replaced with corresponding simulated sensor signals generated in a test laboratory that is remote with respect to the vessel. In step 60, the simulated sensor signals are sent over a communication line from the test laboratory to the vessel and over the sensor signal line to the control system. In step 62, control signals are computed in the control system based on the real and/or the simulated sensor signals. And, in step 64, the control signals are sent over the communication line to the test laboratory.

After the execution of the method according to the invention, in which the test laboratory (40) on basis of the test of the control system (2) and the test results can approve the control system (2), the test laboratory (40) can certify the control system (2) for use in regular operation of the vessel (4).

One of the advantages of the proposed remote testing according to the invention is that one will have a much larger flexibility in the testing of the software and the control system (2) in its entirety under simulated failure situations and under a simulated extensive spectrum of weather loads than what would be the case under conventional testing and certification. At the same time, one avoids the disadvantages and limitations of previously used methods for testing of vessel control systems, namely travel distance, time consuming travels, high cost of travel, time for rigging of equipment for testing, etc. With the proposed invention it is possible to test and certify far more vessels than previously, with a lower number of operators.

Example of Testing of a Control System on a Drilling Vessel.

Figure 7:
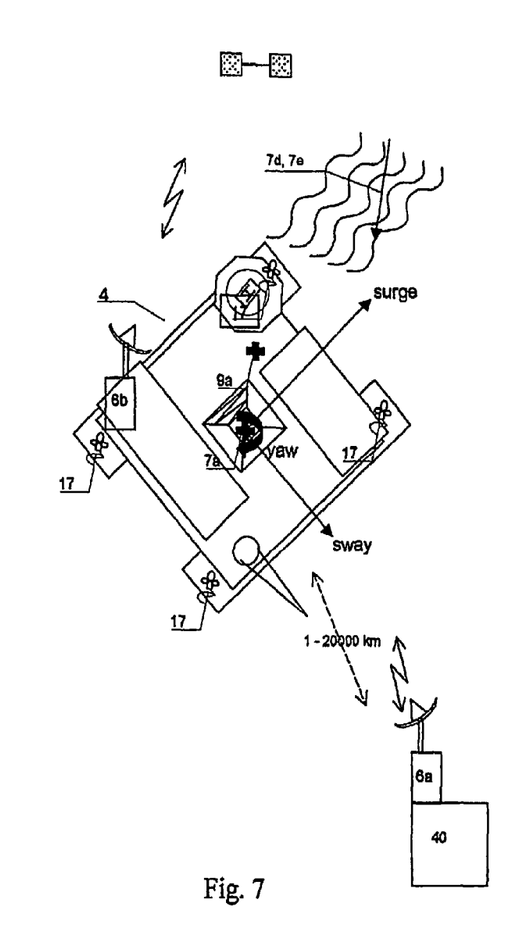
FIG. 7 shows a sketch of a relevant problem for use of the invention where a control system is used to control a drilling platform under dynamic positioning while it is drilling, where the actual position and the desired position of are marked with boldface "x".

The present invention can be used to test if a control system as mentioned above will indeed function in a safe and reliable way. One may imagine the following example: It is desired to test a control system (2) in a drilling vessel (4) as illustrated in FIG. 7. Drilling may be terminated before the test so that potential errors in position under the test with simulated dynamically positioned drilling will not have negative consequences. The drilling vessel (4) includes a control system (2) that corresponds to what is sketched in FIGS. 4a, b and c, and is in the same way connected through a real-time interface (6b) and a communication line (6) and through a real-time interface (6a) to a remote test laboratory (4) as shown in the drawings. The control system (2) comprises control and monitoring of the drilling vessel (4) with propulsion devices (16) like propeller (16) or thrusters (17), and control devices (18) like rudders (18), thrusters (17) in the form of tunnel thrusters and azimuth thrusters. The thrusters (17) can act both as propulsion devices (16) and control devices (18). Under the simulated drilling it is desirable that the drilling vessel (4) is at a stationary position (9a) with a smallest possible position deviation, and with a course (7b) and velocity (7c) that only compensate for the weather in the form of its influence on wind, waves and current. The method for dynamic positioning in agreement with known methods may comprise the following steps that can be executed sequentially:

The control system (2) acquires in real time the sensor data (7) from one or more sensor parameters, such as the measured vessel position (7a) from position sensors (8a), e.g. DGPS receivers, and course (7b) from course sensors (8b) like gyrocompasses, etc.

The control system (2) acquires command signals (9) from a command input device (10), for example a so-called joystick panel, including at least a position specification device (10a), a wheel (10b), a velocity specification device (10c), that give command signals for one or more of desired position (9a) as indicated in FIG. 7, desired course (9b) in the form of angle for rudder or thrusters, and desired speed (9c) in the form of shaft speed for propellers (16) and thrusters (17).

The sensors (8) transmit the sensor signals (7) over a first sensor signal line (12) to the control system (2).

The command input device (10) sends the command signals (9) over a second signal line or command signal line (11) to the control system (2).

The control system (2) then calculates sequentially on basis of one or more of the acquired sensor signals (7a, 7b, 7c, ...) and command signals (9a, 9b, 9c, ...) and possibly a set of required dynamic parameters like mass (m) and axial moments of inertia ($M_1, M_2, \ldots$) for the vessel (4), of the required shaft speed (13a) for propellers (16) and angle (13c) for rudder (18) and possible other control devices to maintain and restore one or more of desired position (9a), course (9b), velocity (9c) etc.

The control system (2) then sends the control signals (13a, 13b, 13c, ...) including the required shaft speed (13b) from the control system (2) over a third signal line (14) to control the shaft speed (13a) for propellers (16) and/or thrusters (17), and angles (13c) for rudders (18) and/or thrusters (17).

The novelty of the invention can be executed with the following steps:

By means of a knob or a switch (15a) on the signal line (12), one or more of the sensor signals (7) from one or more of the sensors (8) are disconnected from the control system (2), and/or by means of a switch (15b) on the signal line (11) one or more of the command signals (9) from the control input device (10) are disconnected from the control system (2).

One or more of the disconnected sensor signals (9), e.g. the measured position (7a) or course (7b), or one or more of the disconnected command signals (9), e.g. desired position (9a) or desired course (9b), are replaced with the corresponding simulated sensor signals (7'), e.g. simulated measured position (7a') or simulated measure course (7b'), or simulated corresponding command signals (9'), e.g. simulated desired position (9a') or simulated desired course (9b'), by blinding one or more of the signal lines (12, 14), where the simulated sensor and command signals (7, 9) are generated in a remote test laboratory (40) with respect to the vessel (4) and are sent over a communication line (6) through one or both of the switches (15a, 15b) and into one or more of the signal lines (12, 14). In this case one may blind the sensor signals (7a) from the DGPS receivers (8a) and replace these by a new, wrong and deviating position a given distance away from the position (9a) where the vessel (4) actually is.

The control system (2) then performs sequential continued computations of the required shaft speed (13b) for propellers (16) and angle (13c) for rudders (18) and other control devices to achieve at least one of desired position, course, velocity, etc. on basis of the input and/or simulated sensor signals (7a or 7a', 7b or 7b', 7c or 7c', ...) and command signals or simulated command signals (9a or 9a', 9b or 9b', 9c or 9c', ...) and the required vessel parameters. The computed response, the so-called control signals (13) from the control system (2) to the actuator (3), like for example the control signal (13a) for the control of propellers (16) and the angle (13c) of rudders (18), can be disconnected or blinded by means of a third switch (15c) so that the control signals (13) do not control the propellers (16) or the rudders (18) during the test, but are instead sent over the communication line (6) to the remote laboratory (40).

The control system (2) may then be regarded as a "black box" (2) where a change is simulated in at least one of the sensor signals (7) to the "black box" (2), and where the "black box" (2) responds with a control signal (13). In the case of the drilling vessel (4) mentioned in the introduction, where there was an error in the DGPS signals, one would experience after 5 minutes that the control system (2) would suddenly attempt to control the propellers, thrusters and rudders of the vessel (4) in order to move the vessel to a new position that the control system would suddenly regard as correct because it had been given as stable and wrong for 5 minutes.

The Motion of a Vessel and the Simulation of this Motion.

Figure 5:
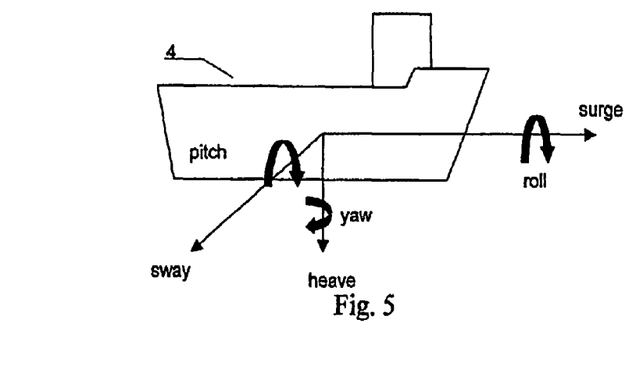
FIG. 5 illustrates an overview of the vessel motions in the form of roll, pitch and heave.

The motion of a vessel (4) is described in terms of the velocity of the ship in surge, sway and yaw, by the position of the center of mass, and by angles in roll, pitch and yaw, see FIG. 5. A vessel will be exposed to forces and moments that influence the motion of the vessel. These forces and moments are due to excitation from wind, current and waves, from the use of actuators (3) like propellers (16), thrusters (17) and rudders (18), from hydrostatic forces that correspond to spring force action due to angles in roll and pitch and position in heave, and from hydrodynamic forces that are related to the velocity and acceleration of the vessel (4). Forces and moments that act on a vessel (4) depend on the vessel motion, whereas the motion of the vessel can be seen as a consequence of the forces and moments that act on the vessel. For a vessel or ship the geometry of the hull, the mass and the mass distribution will be known. In addition estimates of the hydrodynamic parameters of the ship will be known. When the motion of the vessel is given, then forces and moments that act on the ship can be calculated in a simulator (30), for example by use of an algorithm (32). The acceleration and angular acceleration of the vessel may then be calculated from the equations of motion for the vessel, which are found from Newton's and Euler's laws. Such equations of motion are described in textbooks. In the equations of motion the following parameters appear: The vessel mass; the position of the center of mass; the position of the center of buoyancy; the moments of inertia of the vessel; the hull geometry, including length, beam and draft; hydrodynamic added mass; hydrodynamic potential damping; viscous damping; parameters related to restoring forces and moments on the hull due to motion in heave, pitch and roll; and parameters relating the amplitude, frequency and direction of wave components to the resulting forces and moments on the hull. Moreover, the equations of motion include mathematical models for actuator forces from propellers (16) as a function of the propeller speed and pitch, forces from rudders (18) as a function of the rudder angle and the vessel speed, and forces from thrusters (17) as a function of the thruster speed and direction. The following procedure can be used to compute the motion of a vessel (4, 4') over a time interval from T0 to TN:

Suppose that the motion of the vessel is given at the initial time instant T0, and the forces and moments are calculated at this time instant. The acceleration and angular accelerations of the vessel at time T0 can then be computed from the equations of motion for the vessel (4, 4'). Then numerical integration algorithms can be used to calculate the motion of the vessel at time T1=T0+h, where h is the time step of the integration algorithm. For a vessel the time step h will typically be in the range 0.1-1 s. When the motion of the vessel (4, 4') at time T1 is computed, the forces and moments at time T1 can be computed, and the acceleration and angular acceleration at T1 are found from the equations of motion. Again, using numerical integration the motion of the vessel at time T2=T1+h is computed. This procedure can be repeated at each time instant TK=T0+h*K until time TN is reached.

The waves that act on a vessel are described as a sum of wave components where one wave component is a sinusoidal long-crested wave with a given frequency, amplitude and direction. For a given location at sea the prevalent distribution of amplitude and frequency of the wave components will be given by known wave spectra like the JONSWAP or ITTC spectra, where the intensity of the wave spectrum is parameterized in terms of the significant wave height. The resulting forces and moments acting on the vessel will be a function of the amplitude, frequency and direction of the waves, and of the velocity and course of the vessel. Forces and moments from wind will be given by wind speed, wind direction, vessel velocity and the projected area of the ship above the sea surface as a function of the vessel course relative to the wind direction. Forces and moments from current will be given by the current speed, current direction, the projected area of the hull under the sea surface, and by the vessel velocity and course relative to the current direction.

Figure 6:
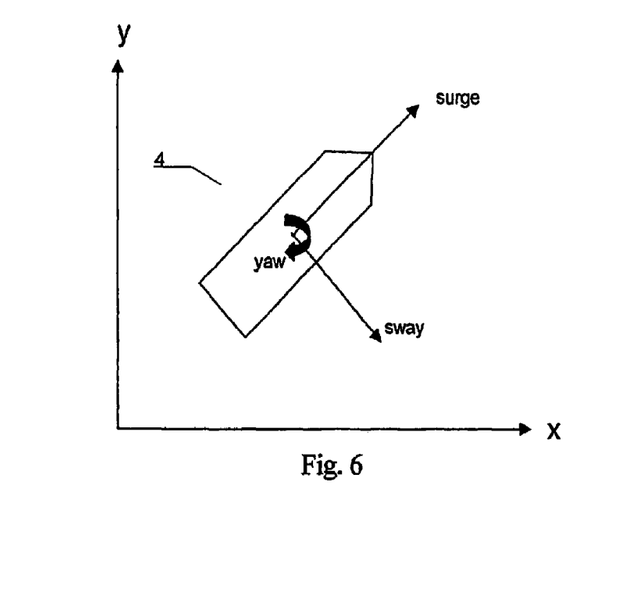
FIG. 6 illustrates an overview of the vessel motions in surge, sway and yaw, which are important in connection with dynamic positioning, e.g., in connection with oil drilling without mooring (or in some cases with mooring).

Dynamic Positioning—DP:

In dynamic positioning, so-called DP, the vessel (4) is controlled in three degrees of freedom (DOF). The desired position in x and y and in course are given as inputs from an operator using keyboard, roller ball, mouse or joy-stick on a control panel (10). A control system (2) is used to compute the required actuator forces in the surge and sway directions, and the actuator moment about the yaw axis so that the vessel achieves the desired position and course. The control system (2) also includes actuator allocation, which involves the computation of propeller forces, rudder forces and thruster forces corresponding to the commanded actuator forces and moments. The control system (2) is implemented through the running of an algorithm on a computer on board the vessel (4). This algorithm compares the desired position (9a) and course (9b) with the measured position and course (7a, 7b), and of basis of this the algorithm computes the required actuator forces and moments using control theory and found in textbooks. In addition the algorithm includes an allocation module where propeller forces, rudder forces and thruster forces are computed. The position and course are measured by DGPS sensors, gyrocompasses, hydro-acoustic sensor systems where transponders are laced on the sea floor, and taut-wires where the inclination of a taut wire fixed on the sea-floor is measured.

Components

Control system (2)

Actuators (propeller 16, thruster 17, rudder 18)

Vessel, ship, drilling vessel, drilling platform, production platform, or other sea-going vessel (4).

Simulated vessel (4'), vessel model in simulator (30) or the simulator algorithm (32).

The dynamic parameters of the vessel: mass m, position of center of mass, moments of inertia about the vessel axes, mass distribution, hull parameters, etc.

Communication line (6), including a first real-time interface (6a) in the remote test laboratory (40), and a second real-time interface (6b) on a first vessel 4a, (6c) on a second vessel (4b), etc.

Sensor signals from sensors (8): 7a: position, 7b: course, 7c: velocity, 7d: wind speed (rel), 7e: wind direction (rel), 7f pitch angle, 7g, roll angle, 7h: hydroacoustic (relative) position with respect to transponders on the seafloor, 8i, GPS/inertial position and course.

Sensors (8): 8a: position sensor; 8b: (gyro)compass, 8c: velocity sensor, 8d: wind speed sensor, 8e: wind direction sensor, 8f: pitch sensor, 8g, roll sensor, 8h: hydroacoustic position sensor, 8i: "Seapath 200" GPS/inertial sensor of position and course.

Command signals (9) from command input device (10): 9a: desired position, 9b: desired course, 9c: desired velocity, etc.

Command input device (10): Position specification device 10a to specify desired position 9a, wheel 10b to specify desired course 9b, velocity specification device 10c to specify desired velocity, etc.

One or more command signal lines (11) or a communication bus for command signals (9) to the control system (2).

One or more sensor signal lines (12) or a communication bus for sensor signals (7) to the control system (2).

Control signals including shaft speed (13a, 13b) for propeller (16) and thruster (17) and angle (13c) for rudder (18) or thruster (17), 13' Control signals that are sent to the remote test laboratory (40)

One or more third signal lines (14) or communication bus from the control system (2) to the actuators (3) (16, 17, 18)

Data logger (15).
Propeller (16)
Thruster (17),
Rudder (18): (together "actuators" (3).
Status signals (19)
Vessel simulator (30) in remote test laboratory (40)

Control algorithm for the computation of control signals (13) to the vessel actuators (16, 17, 18) on basis of sensor signals (7), command signals (9) and the dynamic parameters (5) of the vessel (4), for sending of control signals (13) over a signal line (14) to the actuators (3), for example propellers (16), thrusters (17) or rudders (18).

Algorithm (32) in vessel simulator (30) for the computation of the dynamic motion of the vessel on basis of simulated sensor signals (7), vessel parameters (5), simulated wind speed and wind direction, simulated wave elevation and wave direction, simulated current speed and current direction, etc, and the forces of the actuators (3) on the vessel.

A remote test laboratory (40)

The invention claimed is:

1. In a control system for controlling and monitoring a vessel with control signals to one or more actuators, a computerized method for testing the control system comprising the sequential steps:
one or more sensors sending one or more sensor signals in real time over a sensor signal line to said control system;
a control algorithm in said control system computing said control signals based on one or more of said sensor signals and sending said control signals over a control signal line to said actuators;
disconnecting one or more of said sensor signals from one or more of said sensors so that the disconnected sensor signals do not flow to said control system;
replacing one or more of said disconnected sensor signals with corresponding simulated sensor signals generated in a test laboratory that is remote with respect to said vessel;
sending the simulated sensor signals over a communication line from the test laboratory to the vessel and over said sensor signal line to said control system;
continuing computation of control signals in said control system based on said real and/or said simulated sensor signals, and
sending said control signals over said communication line to said test laboratory.

2. The method of claim 1, comprising simulation by means of an algorithm and on the basis of said control signals, in a simulator in said test laboratory, of a new dynamic state of a vessel model.

3. The method of claim 1, in which said sensor signals comprise one or more sensor parameters selected from the group consisting of:
a position of said vessel determined from at least one of GPS receivers, hydroacoustic position sensors, or integrating acceleration sensors;
vessel course determined from at least one of a gyrocompass or a compass;
vessel velocity determined from at least one of a velocity sensor or an integrating acceleration sensor;
wind speed and a wind direction determined from an anemometer;
vessel roll angle determined from a roll angle sensor; and
vessel pitch angle determined from a pitch angle sensor.

4. The method of claim 1, in which said control signals comprise signals in the form of shaft speed for one or more propellers or thrusters and angles for rudder or thrusters or other control devices.

5. The method of claim 1, further comprising the step of sending command signals to said control system from a command input device over a command signal line to said control system.

6. The method of claim 5, wherein computing said control signals are also based on said command signals.

7. The method of claim 6, wherein said disconnecting step further includes disconnecting said command signals from said command input devices so that said command signals do not flow to said control system.

8. The method of claim 7, wherein the replacing step further includes replacing one or more disconnected command signals with corresponding simulated command signals that are generated in said test laboratory and sending the simulated command signals over said communication line from the test laboratory to the vessel and over said command signal line to said control system.

9. The method of claim 8, wherein continuing computation of control signals is also based on said real and/or simulated command signals.

10. The method of claim 1, in which said command input device is adapted to give a command signal for one or more of a desired position, a desired course, or a desired velocity, and comprises one or more devices from the group consisting of:
at least one position specification device;
a velocity specification device; or
a device for specification of at least one of a desired roll angle, pitch angle, or heave compensation.

11. The method of claim 1, further comprising:
verifying at the test laboratory that the control signals sent to the test laboratory will lead to a desired state of the vessel; and
certifying said control system on the basis of said verifying.

12. The method of claim 1, in which the computation in said control algorithm of said control system uses dynamic parameters of the vessel, including mass of the vessel, the axial moments of inertia of the vessel, the mass distribution of the vessel, and hull parameters of the vessel that determine the geometry of the hull.

13. The method of claim 1, in which the disconnecting of said sensor signals is done by means of a switch on said sensor signal line.

14. The method of claim 7, in which the disconnecting of said command signals is done by means of a switch on said command signal line.

15. The method of claim 1, wherein said remote test laboratory is located on land and the vessel is located between 1 and 20000 km from said test laboratory, and wherein the vessel is in a harbour, in a dock or a yard, moored, or at the open sea.

16. The method of claim 9, in which failure situations are tested by disconnecting one or more sensor signals or command signals at a time to simulate breakdown of components.

17. The method of claim 1, in which a response of the control system in the form of said control signals and status signals are logged on a logger in said test laboratory.

18. The method of claim 1 in which failure situations are tested by changing or generating disturbances in a selection of said simulated sensor signals or by generating external disturbances to said simulated sensor signals including weather, wind, and electrical noise.

19. The method of claim 1, further comprising sending new software for said control system from said test laboratory to said vessel over said communication line.

20. The method of claim 1, further comprising using said test laboratory to approve said control system and certify said control system for regular use in said vessel based on a test of said control system and the test result.

\* \* \* \* \*